(12) United States Patent
Hanko et al.

(10) Patent No.: US 11,156,580 B2
(45) Date of Patent: Oct. 26, 2021

(54) ELECTRODE OF AN ELECTROCHEMICAL MEASURING SYSTEM

(71) Applicant: Endress+Hauser Conducta GmbH+Co. KG, Gerlingen (DE)

(72) Inventors: Michael Hanko, Dresden (DE); Conny Fraas, Altenburg (DE); Matthäus Speck, Göpfersdorf (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 407 days.

(21) Appl. No.: 16/197,838

(22) Filed: Nov. 21, 2018

(65) Prior Publication Data

US 2019/0154624 A1   May 23, 2019

(30) Foreign Application Priority Data

Nov. 23, 2017   (DE) .................. 10 2017 127 656.4

(51) Int. Cl.
*G01N 27/36*   (2006.01)
*G01N 27/403*   (2006.01)
(Continued)

(52) U.S. Cl.
CPC ............ *G01N 27/403* (2013.01); *C23D 3/00* (2013.01); *C23D 5/02* (2013.01); *G01N 27/36* (2013.01); *G01N 27/4166* (2013.01); *H01M 4/00* (2013.01); *G01N 27/301* (2013.01); *G01N 27/4167* (2013.01)

(58) Field of Classification Search
CPC .... G01N 27/36; G01N 27/333; G01N 27/302; G01N 27/301
See application file for complete search history.

(56) References Cited

U.S. PATENT DOCUMENTS 4,412,863 A * 11/1983 Neely, Jr. ................ C04B 28/26
106/623
2009/0127133 A1   5/2009 Hills et al.

FOREIGN PATENT DOCUMENTS

CN   100529751 C   8/2009
CN   101584078 A   11/2009
(Continued)

OTHER PUBLICATIONS

English language translation of Berszan et al. HU 9904607 A1 made by Google translate on Feb. 23, 2021, patent published on Jun. 30, 2003 (Year: 2003).*
(Continued)

*Primary Examiner* — Alexander S Noguerola
(74) *Attorney, Agent, or Firm* — Kelly J. Smith; Endress+Hauser (USA) Holding Inc.

(57) ABSTRACT

The present disclosure relates to an electrode of an electrochemical measuring system and includes a housing having a chamber in which an electrolyte is arranged, and a potential-forming element which is at least partially arranged in the chamber such that the electrolyte at least partially wets the potential-forming element. A discharge line is made of coinage metal or of an alloy comprising a coinage metal and contacts the potential-forming element. A closure element closes the housing and guides discharge line therethrough. An adhesion promoter which comprises a glass and/or a glass-ceramic material is arranged between the closure element and the discharge line.

13 Claims, 1 Drawing Sheet

(51) Int. Cl.
  *H01M 4/00* (2006.01)
  *C23D 3/00* (2006.01)
  *C23D 5/02* (2006.01)
  *G01N 27/416* (2006.01)
  *G01N 27/30* (2006.01)

(56) References Cited

FOREIGN PATENT DOCUMENTS

| CN | 102565157 A | | 12/2011 | | |
|---|---|---|---|---|---|
| DE | 10354100 A1 | | 6/2005 | | |
| DE | 102013101420 A1 | | 8/2014 | | |
| GB | 2073891 A | * | 10/1981 | ............ | G01N 27/28 |
| HU | 9904607 A1 | * | 6/2003 | ............ | G01N 27/36 |

OTHER PUBLICATIONS

Coefficients of Linear Thermal Expansion table at The Engineering Toolbox website downloaded on Feb. 25, 2021 from https://www.engineeringtoolbox.com/linear-expansion-coefficients-d_95.html (Year: 2021).*

Broadly James—F-895 Autoclavable pH Electrode prodict description, downloaded Feb. 25, 2021 from https://www.broadleyjames.com/product/model-f-895/ (Year: 2015).*

Silver-Melting Point from the online periodic table (https://www.periodic-table.org/Silver-melting-point/) downloaded Feb. 26, 2021, published Nov. 17, 2020. (Year: 2020).*

"Glass Viscosity Calculation", author unknown, downloaded from http://www.glassproperties.com/viscosity/ on Jun. 18, 2021 (Year: 2021).*

* cited by examiner

ELECTRODE OF AN ELECTROCHEMICAL MEASURING SYSTEM

CROSS-REFERENCE TO RELATED APPLICATION

The present application is related to and claims the priority benefit of German Patent Application No. 10 2017 127 656.4, filed on Nov. 23, 2017, the entire contents of which are incorporated herein by reference.

TECHNICAL FIELD

The present disclosure relates to an electrochemical measuring system, such as, for example, an electrochemical measuring system for determining an electrochemical potential.

BACKGROUND

Electrochemical measuring systems are used, for example, in pH-value determination, and are used in many applications, e.g., in chemistry, medicine, industry, and environmental or water analysis.

A conventional potentiometric measuring chain (also referred to herein as a sensor) for determining the pH value is generally constructed from two electrodes which each form a half-cell of the potentiometric measuring chain. In particular, such a sensor includes a reference electrode and a pH electrode. The pH electrode is formed by a generally internal glass tube having a pH-sensitive glass membrane, which contains an electrolyte and which closes the glass tube on one side, and a discharge element that contacts the electrolyte. The discharge element usually comprises a silver wire coated with silver chloride, at least in one section. The reference electrode is formed by a further glass tube having a diaphragm and by a reference discharge element (likewise usually designed as Ag/AgCl element) which is located in an electrolyte contained in the glass tube. As a result of the electrolytic contact of the electrodes in a measuring medium, a potential difference, which can be measured via the discharge elements, is formed between the electrodes of the sensor. By means of a measuring circuit, which is connected via a plug connection to the discharge elements, the potential difference is converted into a measurement signal via a data evaluation unit. In order to seal the electrodes against the surroundings on a side facing away from the measuring medium, and in order to avoid the formation of additional potentials by environmental factors, e.g., by penetrating moisture, the electrodes must be sealed tightly on this side. This may be achieved, for example, by glass fusion or by a polymer seal, e.g., in the form of a casting.

For the (glass) fusion, a metal wire (e.g., platinum, $\alpha = 8.8 \cdot 10^{-6}$ $K^{-1}$), suitable for the thermal expansion coefficient ($\alpha$, CTE) (see DIN ISO 7991) of the shaft glass (e.g., Kimble KG-1 or Schott AR glass, with $\alpha = 9.3 \cdot 10^{-6}$ $K^{-1}$ or $\alpha = 9.1 \cdot 10^{-6}$ $K^{-1}$), is attached to the discharge element or the reference discharge element and fused into the glass (H. Galster, pH Measurement: Fundamentals, Methods, Applications, Instrumentation, New York: VCH Publishers, 1991, p. 78 ff.).

Polymer seals for sealing the electrodes are frequently based upon silicone polymers, since these form coherent, i.e., form-fit, force-fit, or firmly-bonded, connections to glass. However, on the other hand, silicone does not form a sealing connection to the silver discharge elements. When a polymer seal is used, a platinum wire is therefore likewise attached to the discharge element or the reference discharge element and provided with a glass pill. This glass pill is introduced into the polymer seal in a coherent manner, so that the polymer seal tightly seals the housing of the electrode.

Attaching a platinum wire to the silver wires serving as discharge elements of the electrodes requires in each case an additional production step, which entails additional costs. In addition, there are considerable material costs.

Moreover, corrosion and transport processes occurring at the connection point between the platinum and silver wire, for example, in the presence of electrolytes, and the realization of the closure in the transition between the melting point and polymer seal, and/or glass body, present manufacturing challenges.

SUMMARY

The present disclosure relates to providing a more easily and more cost-effectively produced electrode for electrochemical measuring systems. The electrode of the present disclosure includes a housing having a chamber in which an electrolyte is arranged, and a potential-forming element at least partially arranged in the chamber such that the electrolyte at least partially wets the potential-forming element.

A discharge line is made of coinage metal or of an alloy comprising a coinage metal and contacts the potential-forming element. A closure element closes the housing and guides passage of the discharge line, and an adhesion promoter, which comprises a glass and/or a glass-ceramic material, is arranged between the closure element and the discharge line.

The discharge line, therefore, includes a coinage metal, i.e., one of the metals, copper, silver, or gold, or an alloy comprising a coinage metal. Since no platinum is attached to the potential-forming element, production is simplified, and material costs are saved. According to an embodiment of the present disclosure, the adhesion promoter includes a material having a thermal expansion coefficient ($\alpha$, CTE) of $10\text{-}50 \times 10^{-6}$ $K^{-1}$.

According to another embodiment of the present disclosure, the thermal expansion coefficients ($\alpha$, CTE) of the adhesion promoter and of the discharge line differ from each other by no more than 40%, no more than 25%, and/or no more than 20%. The expansion coefficient of silver is, for example, $18.9 \times 10^{-6}$ $K^{-1}$. Accordingly, the expansion coefficient of the adhesion promoter, according to a particular embodiment, is between 15.1 and $22.7 \times 10^{-6}$ $K^{-1}$.

The adhesion promoter may be a glass, for example. According to an embodiment of the present disclosure, the adhesion promoter has a working range below 975° C., below 850° C., and/or below 700° C.

Accordingly, the working range is a temperature range characteristic of the respective adhesion promoter, e.g., according to DIN ISO 7884-1, in which a glass has a dynamic viscosity ($\eta$) between $10^3$ dPas to $10^8$ dPas. In practice, the lower temperature limit of this range is also estimated with the Littleton point or the dilatometric softening point ($T_d$) of a glass. Another important characteristic value in this context is also the transformation point ($T_g$) of a glass.

According to the present disclosure, the adhesion promoter is applied between the closure element and the discharge line in a form-fit and/or bonded manner, wherein the adhesion promoter is designed as a layer and/or as a molded body. The adhesion promoter may be a glass, for example.

In one embodiment, the discharge line may be formed from a wire encased in a section of a glass pill applied to the wire. The adhesion promoter may be designed as a layer arranged between the glass pill and the closure element. In an alternative embodiment, the adhesion promoter can itself be applied to the wire in the form of a glass pill encasing a section of the wire. The adhesion promoter may also be arranged as a multilayer layer package, and, as such, may comprise several layers of varying chemical composition between the discharge line, or wire, and the closure element. In all these embodiments, the chemical composition of the adhesion promoter is selected such that it can be applied to the discharge line at a temperature that is less than the melting point of the discharge line.

According to an exemplary embodiment of the present disclosure, the adhesion promoter contains at least one oxide of the elements of groups 1, 2, 4, 5 or 12-16 of the periodic table.

The potential-forming element comprises an electrically conductive material. In one embodiment, the potential-forming element can comprise silver as an electrically conductive material, which is provided with a silver halide coating, such as a silver chloride coating, at least on a part of its surface. According to some embodiments, the discharge line and the potential-forming element have an identical composition, at least at the contact point between the potential-forming element and the discharge line.

In another embodiment, the discharge line and the potential-forming element can be formed by a single electrical conductor, e.g., a wire or a conductor path, made of a coinage metal, wherein the electrical conductor has, in an end section, a coating of a sparingly soluble salt of the coinage metal, e.g., a halide salt of the coinage metal. In this case, the end section of the electrical conductor having the coating forms the potential-forming element, and the remaining section of the electrical conductor forms the discharge line. In a specific example, the electrical conductor can be a silver wire or a conductor path made of silver, and the coating can be a silver chloride coating. In this embodiment, a production step of connecting the potential-forming element and the discharge line to each other is omitted.

The present disclosure furthermore comprises a method for producing an electrode according to one of the embodiments described above. The method includes a step of applying an adhesion promoter to a discharge line which is made of coinage metal or of an alloy comprising a coinage metal and which contacts a potential-forming element, wherein the application takes place at a temperature which is selected to be lower than the melting temperature of the discharge line. The method includes a further step of inserting at least a section of the discharge line provided with the adhesion promoter into a closure element which closes an electrolyte-containing housing such that the potential-forming element contacts the electrolyte.

According to an embodiment of the present disclosure, the adhesion promoter is applied to the discharge line by melting and cooling, on the discharge line, a glass serving as an adhesion promoter.

According to another embodiment, the adhesion promoter is applied to the discharge line by applying a glass paste to the discharge line and subsequently converting the glass paste into a glass.

According to another embodiment, the adhesion promoter is designed to be one-piece or multi-piece. For example, the adhesion promoter can be applied in several layers.

According to another embodiment, the temperature at which the adhesion promoter is applied is less than 960° C., less than 800° C., and/or less than 700° C. In this embodiment, the discharge line can be formed from silver.

BRIEF DESCRIPTION OF THE DRAWINGS

The present disclosure is explained in further detail below on the basis of the exemplary embodiments shown in the figures. Shown are.

DETAILED DESCRIPTION

Figure 1:
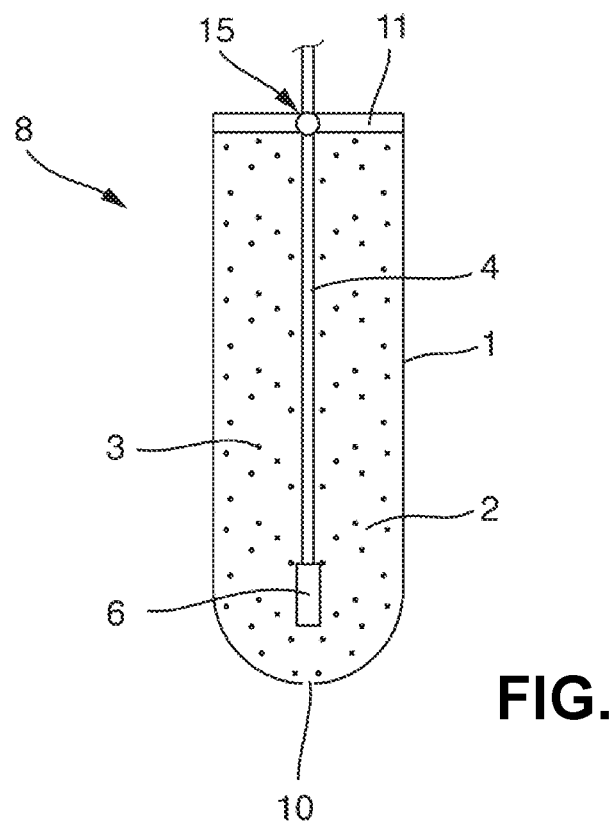
FIG. 1 shows a schematic longitudinal section of a reference electrode.

FIG. 1 schematically shows a structure of a reference electrode 8. The reference electrode 8 can be inserted into a medium, e.g., a measuring liquid, together with a pH electrode (not shown), in order to measure the pH. In this case, the pH electrode and the reference electrode 8 each form a potentiometric half-cell of a potentiometric measuring chain. The measuring chain voltage, i.e., the voltage detectable between the pH electrode and the reference electrode 8, is a measure of the pH of the medium. The reference electrode 8 can likewise be used in other electrochemical sensors, e.g., in potentiometric sensors for detecting the concentration of ions other than hydronium ions and in amperometric or voltammetric sensors.

The reference electrode 8 comprises a housing 1 which is made of glass and which is at least partially filled with an electrolyte 3. A closure element 11 is inserted into the housing 1 in order to seal the upper housing section against the electrolyte 3. The part of the housing 1 which is delimited by the closure element 11 is the chamber 2.

An electrochemical transfer 10 is arranged in the wall of the chamber 2 and forms an electrolytic connection between the electrolyte 3 and the medium.

Into the chamber 2 is inserted a discharge element, which has a potential-forming element 6 in a front section on the transfer side. The potential-forming element 6 is contacted by a further section of the discharge element serving as a discharge line 4. The discharge line 4 serves to discharge the potential forming at the potential-forming element 6. It is led out through the closure element 11 to a measuring circuit (not shown). In the present example, the discharge line 4 and the potential-forming element 6 are formed by a (single) wire made of a coinage metal, e.g., silver, wherein the potential-forming element 6 is formed by a section of the wire provided with a coating made of a sparingly soluble salt of the coinage metal, e.g., silver chloride.

The closure element 11, which is only schematically indicated in FIG. 1, is designed as a polymer seal in the present example. In order to ensure sufficient sealing even in the region of the feedthrough of the discharge line 4 through the closure element 11, an adhesion promoter 15 is arranged between the discharge line 4 and the closure element 11.

Figure 2:
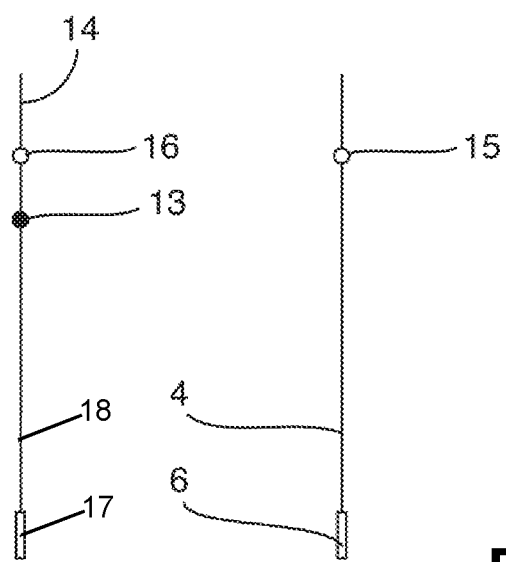
FIG. 2 shows a schematic representation of a potential-forming element with a discharge line according to the prior art and of a potential-forming element with a discharge line according to the present disclosure.

FIG. 2 schematically shows the structure of a discharge element with a potential-forming element 17 and a discharge line 18 which contacts it (left), and a discharge element according to the present disclosure with the potential-forming element 6 and discharge line 4 (both shown in FIG. 1) which contacts it (right). Both discharge lines 4, 18 consist of a silver wire coated with silver chloride. At a lower end, both discharge lines 4, 18 are respectively connected to the potential-forming elements 6, 17, which are designed as a silver chloride coating applied to the silver wire in the form of a silver chloride pill.

The discharge element (left) has, at a top end to be connected to a closure element, such as closure element 11, a platinum wire 14 attached to the silver wire forming the discharge line 18. The platinum wire 14 is connected to the discharge line 18 by means of a welded joint 13. On the platinum wire 14 is located an adhesion promoter 16 which serves to connect the platinum wire to the closure element, such as closure element 11. For this purpose, the adhesion promoter 16 comprises glass and/or a glass-ceramic material in the form of a glass pill. The glass or the glass-ceramic material is, with $9.3 \times 10^{-6}$ $K^{-1}$, selected such that its thermal expansion coefficient substantially corresponds to the thermal expansion coefficient of platinum ($8.8 \times 10^{-6}$ $K^{-1}$).

The discharge element according to the present disclosure (right) can do without the attached platinum wire. It is thus formed by a single silver wire which is provided at its front section with a silver chloride coating in the form of a silver chloride pill. This section forms the potential-forming element 6, and the section of the silver wire adjacent thereto forms the discharge line 4. The adhesion promoter 15, which differs in its chemical composition from the adhesion promoter 16 of the discharge element (left), is arranged on a rear section remote from the potential-forming element 6. The adhesion promoter 15 of the discharge element according to the present disclosure has a working range which is at least partially below 975° C. The thermal expansion coefficient ($\alpha$, CTE) of the adhesion promoter 15 and the discharge line 4 deviate from each other as little as possible. The discharge line 4 is made of a coinage metal, and the adhesion promoter 15 contains an oxide of the elements of groups 1, 2, 4, 5 or 12-16 of the periodic table.

The method for producing the reference electrode 8 according to the present disclosure (see FIG. 2, right) comprises the following steps. First, glass serving as adhesion promoter 15 is applied to an end section of the discharge line 4 by dipping the discharge line 4 into a glass melt, for example.

Examples of such a glass are (specifications in mol %):
$P_2O_5$ (26.26), $B_2O_3$ (4.99), $Al_2O_3$ (2.20), $Li_2O$ (11.24), $Na_2O$ (14.27), $K_2O$ (7.73), ZnO (19.95), $Nb_2O_5$ (8.76), $WO_3$ (3.62), BaO (0.95), $Sb_2O_3$ (0.04) ($T_g$=413° C., $\alpha$=14.5·$10^{-6}$ $K^{-1}$) known from: U.S. Pat. No. 9,018,114$B_2$ $P_2O_5$ (29.64), $B_2O_3$ (5.90), $SiO_2$ (0.54), $Al_2O_3$ (1.06), $Li_2O$ (10.86), $Na_2O$ (26.87), $K_2O$ (0.57), ZnO (5.71), $Nb_2O_5$ (10.66), $TiO_2$ (7.44), BaO (0.71), $Sb_2O_3$ (0.04) ($T_g$=460° C., $\alpha$=14.3·$10^{-6}$$K^{-1}$) known from: U.S. Pat. No. 9,018,114$B_2$ $TeO_2$ (60), BaO (25), ZnO (15) ($T_g$=364° C., $\alpha$=16.6·$10^{-6}$ $K^{-1}$) [Beiming Zhou et al., Proc. SPIE 2013, 8626, 86261F]

AGC 1991Y10 ($SiO_2$—$R_2O$—$TiO_2$) ($T_g$=410° C., $\alpha$=15.0·$10^{-6}$ $K^{-1}$) offered by: AGC Electronics Co., Ltd.

Alternatively, glass paste of the corresponding glass may first be applied to the discharge line 4. For example, the glass paste may be prepared as follows:
50-90 wt % glass
5-40 wt % pasting agent (e.g., benzyl butyl phthalate, di(propylene glycol) dibenzoate, propylene carbonate)
2-10 wt % binder (e.g., carboxy methyl cellulose, ethyl cellulose, polypropylene carbonate)
0-5 wt % dispersant (e.g., DARVAN C-N, Dow Duramax)

The conversion of the glass paste applied to the discharge line 4, e.g., by heating and cooling, results in the adhesion promoter 15. The temperature for applying the adhesion promoter 15 may be less than 960° C. In this case, the adhesion promoter 15 carries out phase transformation and/or chemical conversion steps.

The section of the discharge line 4 provided with the adhesion promoter 15 is subsequently inserted into the closure element 11, and the housing 1 of the reference electrode 8 is closed with the closure element 11.

The invention claimed is:

1. An electrode of an electrochemical measuring system, comprising:
    a housing having a chamber in which an electrolyte is arranged;
    a potential-forming element which is at least partially arranged in the chamber such that the electrolyte at least partially wets the potential-forming element;
    a discharge line which is made of coinage metal or of an alloy comprising a coinage metal and which contacts the potential-forming element;
    a closure element which closes the housing and through which the discharge line is guided; and
    an adhesion promoter which comprises a glass and/or a glass-ceramic material and is arranged between the closure element and the discharge line,
    wherein the adhesion promoter has a working range below 700° C., in which the dynamic viscosity of the adhesion promoter has a value between $10^3$ dPas to $10^8$ dPas.

2. The electrode of claim 1, wherein the adhesion promoter has a thermal expansion coefficient ($\alpha$, CTE) of 10 to $50 \times 10^{-6}$ $K^{-1}$.

3. The electrode of claim 1, wherein the thermal expansion coefficients ($\alpha$, CTE) of the adhesion promoter and the discharge line differ from each other by no more than 40%.

4. The electrode of claim 3, wherein the thermal expansion coefficients ($\alpha$, CTE) of the adhesion promoter and the discharge line differ from each other by no more than 25%.

5. The electrode of claim 4, wherein the thermal expansion coefficients ($\alpha$, CTE) of the adhesion promoter and the discharge line differ from each other by no more than 20%.

6. The electrode according to claim 1, wherein the adhesion promoter contains at least one oxide of the elements 1, 2, 4, 5 or 12-16 of the periodic table.

7. The electrode of claim 1, wherein an electrically conductive material of the discharge line or the potential-forming element have the same composition at the contact point between the potential-forming element and the discharge line.

8. The electrode of claim 1, wherein the adhesion promoter is applied between the closure element and the discharge line in a form-fit or bonded manner.

9. The electrode of claim 1, wherein the adhesion promoter is configured as a layer or a molded body.

10. A method for producing an electrode of an electrochemical measuring system, comprising the steps of:
    applying an adhesion promoter to a discharge line which is made of coinage metal or of an alloy comprising a coinage metal and which contacts a potential-forming element, wherein the application takes place at a temperature which is selected to be lower than the melting temperature of the discharge line and wherein the temperature for applying the adhesion promoter is less than 700° C.; and
    inserting at least a section of the discharge line provided with the adhesion promoter into a closure element, which closes a housing containing an electrolyte such that the potential-forming element contacts the electrolyte.

11. The method of claim 10, wherein applying the adhesion promoter to the discharge line includes melting and cooling a glass on the discharge line.

12. The method of claim 10, wherein applying the adhesion promoter to the discharge line includes applying a glass paste to the discharge line and subsequently converting the glass paste into a glass.

13. The method according to claim 10, wherein the adhesion promoter is configured as one-piece or multi-piece.

\* \* \* \* \*